(12) United States Patent
Tsirkin et al.

(10) Patent No.: US 12,487,842 B2
(45) Date of Patent: Dec. 2, 2025

(54) SECURE CONTROL OF PACKET FILTER PROGRAMS BY USER SPACE PROCESSES IN VIRTUAL MACHINES

(71) Applicant: RED HAT, INC., Raleigh, NC (US)

(72) Inventors: Michael Tsirkin, Haifa (IL); Jesper Brouer, Frederikssund (DK)

(73) Assignee: Red Hat, Inc., Raleigh, NC (US)

( * ) Notice: Subject to any disclaimer, the term of this patent is extended or adjusted under 35 U.S.C. 154(b) by 877 days.

(21) Appl. No.: 17/513,784

(22) Filed: Oct. 28, 2021

(65) Prior Publication Data
US 2023/0140827 A1     May 4, 2023

(51) Int. Cl.
*G06F 9/455*     (2018.01)
*G06F 9/46*      (2006.01)
*G06F 9/50*      (2006.01)

(52) U.S. Cl.
CPC .......... *G06F 9/45558* (2013.01); *G06F 9/468* (2013.01); *G06F 9/5077* (2013.01); *G06F 2009/45579* (2013.01); *G06F 2009/45583* (2013.01); *G06F 2009/45595* (2013.01); *G06F 2209/501* (2013.01)

(58) Field of Classification Search
CPC .... G06F 9/45558; G06F 9/468; G06F 9/5077; G06F 2009/45579; G06F 2009/45583; G06F 2209/501
See application file for complete search history.

(56) References Cited

U.S. PATENT DOCUMENTS 7,116,681 B1 * 10/2006 Hovell .................. H04L 61/251
                                                        370/402
7,430,205 B2 *  9/2008 Ota .......................... H04L 45/66
                                                        370/469
(Continued)

FOREIGN PATENT DOCUMENTS

WO     2017218173 A1    12/2017

OTHER PUBLICATIONS

Haq, et al., "Design and Implementation of Sandbox Technique for Isolated Applications." IEEE, 2016, 5 pages.
(Continued)

*Primary Examiner* — April Y Blair
*Assistant Examiner* — Jonathan R Labud
(74) *Attorney, Agent, or Firm* — Womble Bond Dickinson (US) LLP

(57) ABSTRACT

An example method may include: receiving, by a hypervisor, a data packet, identifying a memory location associated with a guest virtual machine and accessible to the guest virtual machine and the hypervisor, wherein a program mapping table comprising one or more mapping table entries is stored at the memory location, each mapping table entry specifying a program selection criterion and a packet processing program. The example method may further include identifying, among the one or more mapping table entries in the program mapping table stored at the memory location, a mapping table entry comprising a particular program selection criterion that is satisfied by the data packet, wherein the identified mapping table entry specifies a first packet processing program, and executing the first packet processing program, wherein the data packet is provided to the first packet processing program as input.

18 Claims, 7 Drawing Sheets

(56) References Cited

U.S. PATENT DOCUMENTS

| | | | |
|---|---|---|---|
| 7,596,097 B1* | 9/2009 | McCowan | H04L 43/00 370/359 |
| 10,606,631 B2 | 3/2020 | Tsirkin et al. | |
| 10,623,372 B2 | 4/2020 | Wang et al. | |
| 10,642,501 B1* | 5/2020 | Patel | G06F 3/0619 |
| 10,956,226 B2 | 3/2021 | Chuppala et al. | |
| 11,074,094 B2 | 7/2021 | Tsirkin et al. | |
| 2003/0009584 A1* | 1/2003 | Basso | H04L 45/02 709/238 |
| 2012/0079232 A1* | 3/2012 | Hinton | G06F 12/1009 711/207 |
| 2012/0304205 A1* | 11/2012 | Van Doorn | H04N 21/812 725/9 |
| 2018/0365160 A1* | 12/2018 | Jiang | G06F 9/45558 |
| 2020/0092194 A1* | 3/2020 | Tillotson | H04L 45/742 |
| 2021/0064443 A1 | 3/2021 | Tsirkin et al. | |
| 2021/0328902 A1* | 10/2021 | Huselton | H04L 43/0817 |

OTHER PUBLICATIONS

Amit, et al., "The Design and Implementation of Hyperupcalls." USENIX—The Advanced Computing Systems Association, 2018 USENIX Annual Technical Conference. Jul. 11-13, 2018, Boston, MA, USA. 16 Pages.

Tu, et al., "Accelerating Virtual Network Founctions with Fast-Slow Path Architecture Using express Data Path." https://ieeexplore.ieee.org/document/9109264. IEEE 2020, downloaded Jun. 26, 2020. pp. 1-13.

* cited by examiner

FIG. 3A

Program Mapping Table 216

| CRITERION 340A | PROGRAM(S) 342A | PROCESSOR(S) 344A |
|---|---|---|
| Incoming Packet is in IPv4 format | P1 (Encapsulate incoming packet into service chaining packet having Network Service Header); P2 (Send data packet to Host B) | * (any) |

FIG. 3B

Program Mapping Table 224

| CRITERION 340B | PROGRAM(S) 342B | PROCESSOR(S) 344B |
|---|---|---|
| Packet's port is 80 or 8080 | P3 (Perform URL Filtering); P4 (Send filtered packet (if any) to Host C) | 1 |
| Packet's port is not 80 and not 8080 | P4 (Send packet to Host C) | 2 |

FIG. 3C

Program Mapping Table 234

| CRITERION 340C | PROGRAM(S) 342C | PROCESSOR(S) 344C |
|---|---|---|
| Packet is in IPv4 format | P5 (Perform Network Address Translation (NAT)); P6 (Send packet to Host D) | 1, 2, 3, 4 |
| Packet is in IPv6 format | P6 (Send packet to Host D) | 5, 6, 7 |

FIG. 3D

Program Mapping Table 244

| CRITERION 340D | PROGRAM(S) 342D | PROCESSOR(S) 344D |
|---|---|---|
| Packet's Dest. ip.addr <= 10.10.50.1 | P7 (De-encapsulate packet's payload into outgoing packet); P8 (Send outgoing packet to Internet gateway G1) | 1, 2, 3 |
| Packet's Dest. ip.addr > 10.10.50.1 | P7 (De-encapsulate packet's payload into outgoing packet); P9 (Send outgoing packet to Internet gateway G2) | 4, 5, 6, 7 |

SECURE CONTROL OF PACKET FILTER PROGRAMS BY USER SPACE PROCESSES IN VIRTUAL MACHINES

TECHNICAL FIELD

The present disclosure is generally related to virtualization in a computing environment, and more particularly, to secure control of packet filter programs by user space processes in virtual machines.

BACKGROUND

Virtualization allows multiplexing of an underlying host machine between different virtual machines. The host machine allocates a certain amount of its storage resources to each of the virtual machines. Each virtual machine is then able to use the allocated storage resources to execute applications, including operating systems (referred to as guest operating systems), concurrently and in isolation from other applications on the host machine. Executable code that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer. The hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 3A-3D depict example data structures representing program mapping tables that map packet selection criteria to respective packet processing programs and processors, in accordance with one or more aspects of the present disclosure;

DETAILED DESCRIPTION

Figure 1:
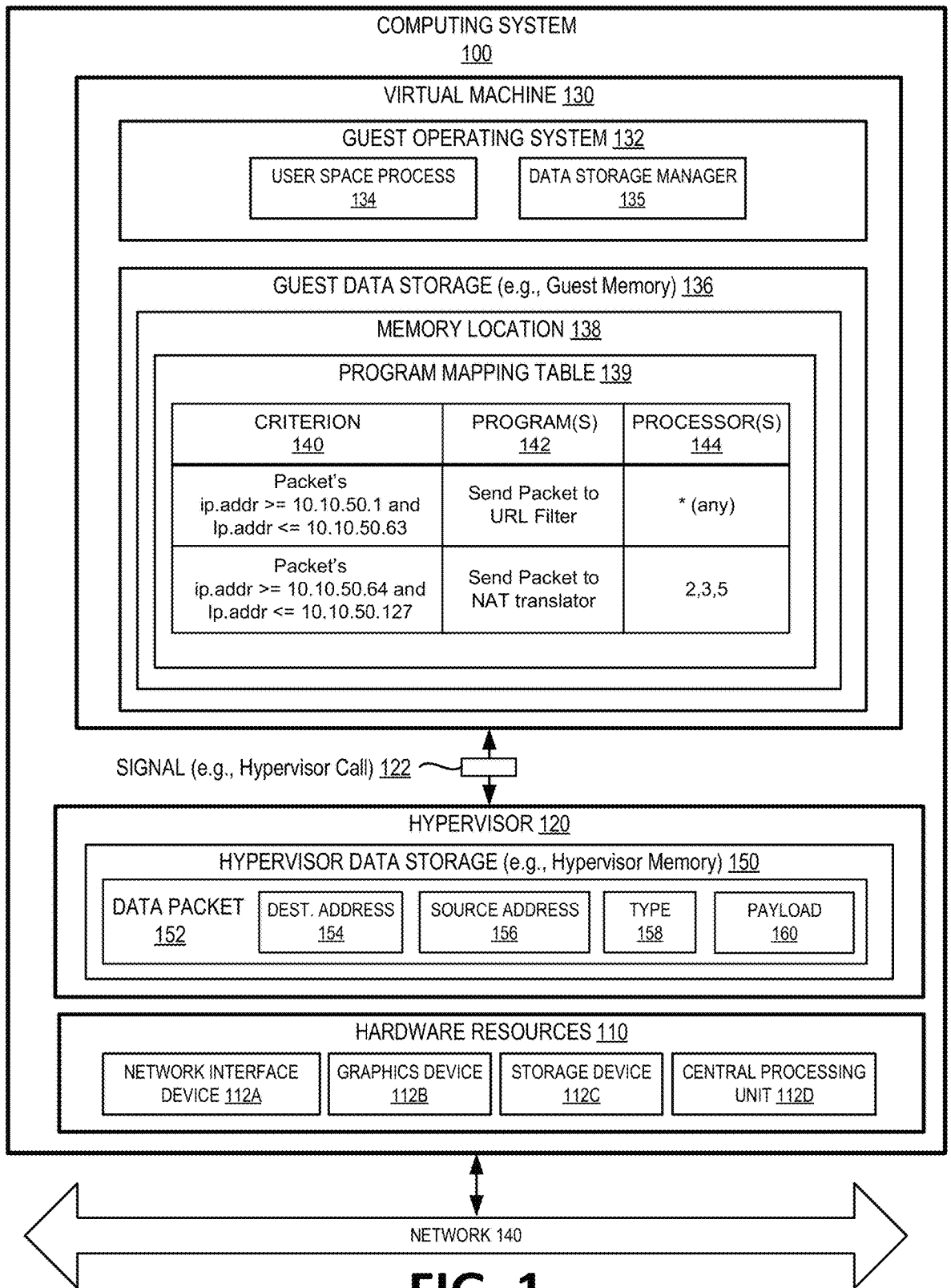
FIG. 1 depicts a high-level block diagram of an example computing system that enables a hypervisor to execute a packet processing program for a guest virtual machine when the hypervisor receives a packet that satisfies a criterion specified by the guest virtual machine, in accordance with one or more aspects of the present disclosure.

Described herein are systems and methods for secure control of packet filter programs by user space processes in virtual machines. A computer system can receive data from a network in the form of packets, and each the packets can cause a network interface card to send an interrupt to a hypervisor, which can efficiently process the packets applications, such as 5G, or other telecommunications applications perform application specific packet processing using application specific packet processing logic. The application executes in a guest virtual machine, which provides protection against unsafe program code. However, processing packets in the guest virtual machine is slower than processing the packets in the hypervisor. For example, the hypervisor invokes the virtual machine to process each packet, which can be time consuming. Packet-processing performance could be improved by executing the application-specific processing logic in the hypervisor. However, executing program code from a guest virtual machine in a hypervisor is unsafe. The program code could perform operations, such as accessing memory for which the guest does not have permission, thereby gaining access to unpermitted data.

Aspects of the present disclosure address the above and other deficiencies by providing technology that enables secure processing of packets by secure processing programs that the hypervisor selects and executes according to criteria specified by the guest virtual machine. The secure processing programs can be programs that are trusted by the hypervisor, e.g., programs that have been verified to be safe to execute with the hypervisor's privileges. The guest virtual machine, or user-level process executing in the guest virtual machine, can specify an association between a criterion and a secure program identifier of a program the hypervisor is to execute in response to receiving a packet that satisfies the criterion. The criterion can be, for example, that a numeric value in a received packet, such as a destination address, is within a specified range of values. If the numeric value is in the range, then the criterion is satisfied.

The guest virtual machine can securely communicate the association to the hypervisor by storing the criterion and associated program identifier in a memory region shared between the guest virtual machine and the hypervisor. Thus, the guest virtual machine can efficiently create and update the associations used by the hypervisor to process incoming packets. The guest virtual machine can specify one or more such associations, which can be stored in the shared memory region as a mapping table that includes a plurality of entries, each associating a selection criterion with a respective program identifier. The guest virtual machine can also specify, for each criterion, one or more specified processors on which the program identified by the associated program identifier is to be executed. If the specified processors are not specified, the hypervisor can execute the program on the same processor that receives the packet. Thus, the guest virtual machine can distribute the packet processing load among a set of processors. If the guest virtual machine specifies more than one processor for a particular criterion, then the hypervisor can select one of the specified processors according to a processor allocation policy, e.g., round-robin allocation, random allocation, or other suitable allocation policy.

In response to receiving a packet from a network interface device, the hypervisor identifies a criterion that is satisfied by the packet, e.g., by evaluating the criterion of each association in the mapping table. The hypervisor can then execute the processing program associated with a satisfied criterion. The hypervisor can execute the processing program on the processor that received the packet. Alternatively, if the guest virtual machine has specified one or more processors for the satisfied criterion, then the hypervisor can forward the packet to one of the specified processors, which can execute the processing program. If more than one processor is associated with the criterion, the hypervisor can select one of the processors using a suitable processor allocation policy. The packet processing program can be, for example, a Berkeley packet filter (BPF) and/or Express Data Path (XDP) program, which can be a sequence of bytecode operations. As an example. A packet processing program can encapsulate a payload from the received packet into a second packet, send the second packet to a destination address.

The systems and methods described herein include technical improvements to virtualization technology. In particular, aspects of the present disclosure may enhance the throughput and reduce the latency of application-controlled processing of incoming network packets without executing arbitrary, potentially unsafe, application program code at the hypervisor's privilege level. An application specifies which of a set of secure programs is to be executed by the hypervisor in response to receiving a packet that satisfies application-specified criteria. Each of the secure programs can be pre-verified to be safe for execution by the hypervisor at the hypervisor's privilege level. The secure programs can be provided by trusted sources and digitally authenticated, e.g., using a message authentication code (MAC), which can provide an assurance that the secure program. Since the application specifies which secure programs are to be executed, and the criteria for executing them, by storing a mapping between criteria and program identifiers in shared memory, the application can efficiently create and update the mapping used by the hypervisor to process packets without the overhead of performing hypercalls. Thus, the application can efficiently modify the criteria and program identifiers, as may be needed in network architectures that can change or be reconfigured frequently, such as service chain architectures in which paths through service functions on different network hosts can be configured dynamically by modifying the packet processing logic (e.g., criteria and actions) on the network hosts. Further, the mapping for each secure program can specify one or more processors on which the program can be executed. The hypervisor can select one of the processors using a processor allocation algorithm, so the secure programs can scale across multiple processors to maintain efficient performance as the workload increases.

Various aspects of the above referenced methods and systems are described in details herein below by way of examples, rather than by way of limitation. The examples provided below discuss a virtualized computer system where the user space processes are managed by aspects of a virtual machine, a hypervisor, a host operating system, or a combination thereof. In other examples, the user space processes are managed by a computing system that uses other forms of virtualization (e.g., operating-system-level virtualization) and may be absent the hypervisor discussed below.

FIG. 1 depicts a high-level block diagram of an example computing system that enables a hypervisor to execute packet processing programs for a guest virtual machine in response to receiving a packet that satisfies a criterion specified by the guest virtual machine, in accordance with one or more aspects of the present disclosure. Computing system 100 may include hardware resources 110, a hypervisor 120, a guest virtual machine 130, a guest operating system 132, one or more user space processes 134, and may communicate with other computing systems via a network 140. It should be noted that other architectures for computing system 100 are possible, and that the implementations of the computing system utilizing embodiments of the disclosure are not necessarily limited to the specific architecture depicted.

Computing system 100 may be a single computing machine or multiple computing machines arranged in a homogenous or heterogeneous group (e.g., cluster, grid, server farm). Computing system 100 may include one or more rack mounted servers, workstations, desktop computers, notebook computers, tablet computers, mobile phones, palm-sized computing devices, personal digital assistants (PDAs), etc. In one example, computing system 100 may be a computing device implemented with x86 hardware. In another example, computing system 100 may be a computing device implemented with PowerPC®, SPARC®, other hardware, or a combination thereof. In either example, computing system 100 may include one or more hardware resources 110.

Hardware resources 110 may provide hardware features for performing computing tasks. In one example, one or more of the hardware resources may correspond to a physical device of computing system 100. In another example, one or more of the hardware resources may be provided by hardware emulation and the corresponding physical device may be absent from computer system. For example, computing system 100 may be a server machine that does not include a graphics device (e.g., graphics card) or includes a graphics device that does not support a particular hardware feature. Hypervisor 120 may provide the hardware feature of the hardware resource by emulating a portion of the hardware resource (e.g., provide a virtualized graphics device). The emulation of a portion of a hardware resource may be provided by hypervisor 120, virtual machine 130, host operating system (not shown), another hardware resource, or a combination thereof.

Hardware resources 110 may include a network interface device 112A, a graphics device 112B, a storage device 112C, a central processing unit 112D, other physical or emulated devices, or combination thereof. Network interface device 112A may provide access to a network internal to the computing system 100 or external to the computing system 100 (e.g., network 140) and in one example may be a network interface controller (NIC). Graphics device 112B may provide graphics processing for the computing system 100 and/or one or more of the virtual machines 130. Storage device 112C may include any data storage that is capable of storing digital data, such as physical memory devices including volatile memory devices (e.g., RAM), non-volatile memory devices (e.g., NVRAM), other types of memory devices, or a combination thereof. Storage device 112C may include mass storage devices, such as solid-state storage (e.g., Solid State Drives (SSD)), hard drives, other persistent data storage, or a combination thereof. Central processing unit 112D may refer to devices capable of executing instructions encoding arithmetic, logical, or I/O operations. Central processing unit 112D may be a single core processor, which may be capable of executing one instruction at a time (e.g., single pipeline of instructions) or a multi-core processor, which may simultaneously execute multiple instructions. One or more of the hardware resources 110 may be combined or consolidated into one or more physical devices or may partially or completely emulated by hypervisor 120 as a virtual device.

Hypervisor 120 may also be known as a virtual machine monitor (VMM) and may provide virtual machine 130 with access to one or more features of the underlying hardware resources 110. In the example shown, hypervisor 120 may run directly on the hardware of computing system 100 (e.g., host machine). In other examples, hypervisor 120 may run on or within a host operating system (not shown). Hypervisor 120 may manage system resources, including access to hardware resources 110. Hypervisor 120, though typically implemented as executable code, may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc. Hypervisor 120 may support any number of virtual machines (e.g., a single VM, one hundred VMs, etc.).

Virtual machine 130 may execute guest executable code based on an underlying emulation of the hardware resources. Virtual machine 130 may support, for example, hardware emulation, full virtualization, para-virtualization, operating system-level virtualization, other virtualization technology, or a combination thereof. The guest executable code may include a guest operating system 132 that manages the execution of one or more user space processes 134. Virtual machine 130 may include a guest operating system 132, which may include one or more of Microsoft® Windows®, Linux®, Solaris®, or other operating system.

Guest operating system 132 may include a data storage manager 135 that manages portions of guest data storage 136. Guest data storage 136 may be a portion of data storage that is allocated by hypervisor 120 for use by virtual machine 130. Data storage manager 135 may configure and manage access to different portions of guest data storage 136. Data storage manager 135 may segregate guest data storage 136 into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with diminished privileges (e.g., user space mode, user space privilege) as well as processes with enhanced privileges. In one example, the portion of guest data storage 136 associated with the enhanced privileges may be designated as kernel space and the portion of guest data storage 136 associated with the diminished privileges may be designated as user space. In other examples, there may be more or less than two portions of guest data storage 136.

Guest operating system 132 may manage the execution of one or more computing processes. A computing process may comprise one or more streams of execution for executing programmed instructions. The stream of instructions may include a sequence of instructions that can be executed by one or more processing devices. A computing process may be managed by a kernel or may be a part of kernel (not shown). In one example, a computing process may be an instance of a computer program that is being executed and may contain executable program code and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes may be associated with a particular level of privilege and each computing process may have a similar level of privilege or they may have different levels of privilege. The privilege levels of a computing process may be the same or similar to protection levels (e.g., processor protection rings) and may indicate an access level of a computing process to hardware resources (e.g., virtual or physical resources). There may be multiple different privilege levels assigned to the computing process. In one example, the privilege levels may correspond generally to either a kernel privilege level or a user space privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications. As shown in FIG. 1, guest operating system 132 may manage multiple computing processes, e.g., one or more user space processes 134.

User space process 134 may be a computing process that is associated with user space privileges. A user space process (e.g., user mode process, user privilege process) may have diminished privileges that provide the user space process access to a user space portion of guest data storage 136 without having access to a kernel space portion of guest data storage 136. In contrast, a kernel process may have enhanced privileges that provide the kernel process access to the user space portion and a kernel space portion of guest data storage 136. In one example, a user space process 134 may be an application process, a system process, a background process (e.g., daemon or service), or a combination thereof. In one example, the privilege associated with a user space process may change during execution and a computing process executing in user space (e.g., user mode, user land) may be granted enhanced privileges by the guest operating system and function in kernel space (e.g., kernel mode, kernel land). This granting of enhanced privileges may enable a user space process 134 to perform an operation with enhanced privileges. In another example, the privilege (s) associated with a user space process may remain constant during execution and the user space process may request an operation be performed by another computing process that has enhanced privileges (e.g., operating in kernel space).

Data storage manager 135 may provide one or more of the user space processes 134 with access to portions of guest data storage 136. Data storage manager 135 may organize and configure guest data storage 136 into one or more memory locations 138. The memory location 138 may be a location in guest data storage 136 that is accessible by the virtual machine 130 and by the hypervisor 120. In one example, the memory location 138 may include a portion of guest memory and may be located at one or more memory addresses within guest data storage 136. The memory addresses may be physical addresses, virtual addresses, other addresses, or a combination thereof and may be associated with the beginning, end, or other location of a storage unit. In another example, the memory location 138 may include a portion of a mass storage device (e.g., secondary storage) and the address(es) of the memory location 138 may include one or more identifiers of a file system object, database object, other object, or a combination thereof. The mass storage device may include a hard disk drive (HDD), a solid-state drive (SSD), other persistent data storage, or a combination thereof.

In some embodiments, the virtual machine 130, the user space processes 134 and/or the guest operating system 132 may use the data storage manager 135 to configure, e.g., allocate, the memory location 138. Descriptions herein of operations performed by the user space process 134 with respect to the memory location 138 also apply to guest code executed by the virtual machine 130, which can include code of the guest operating system 132, user space process 134, and data storage manager 134. The memory location 138 may be allocated by and associated with the virtual machine 130. If the virtual machine 130 (or one of its components) allocates the memory location 138, then the virtual machine 130 may determine an address of the memory location 138 (e.g., by receiving the memory address as a result of a memory allocation operation), and may provide the memory address to the hypervisor 120. In some embodiments, the hypervisor 120 may configure (e.g., allocate) and associate the memory location 138 with the virtual machine 130 and/or the user space process 134. If the hypervisor 120 allocates the memory location 138, then the hypervisor 120 may receive the memory location (e.g., as a result of a memory allocation operation) and provide the address of the memory location to the virtual machine 130.

The memory location 138 may be capable of storing a program mapping table 139, which can include one or more mapping table entries, each mapping a program selection criterion 140 a packet processing program 142 to be executed if a received packet satisfies the criterion 140. Each mapping table entry may optionally specify one or more processors 144 on which to execute the packet processing program. The virtual machine 130, or a component thereof, such as the user space process 134 or guest operating system 132, may generate the program mapping table 139 and store the program mapping table 130 in the memory location 138. In this way, the virtual machine 130, or a component thereof, may identify one or more programs to be performed by the hypervisor 120 in response to each particular criterion 140. Thus, the virtual machine 120 can control the packet processing configuration of the hypervisor 120, and the hypervisor 120 need not invoke the virtual machine 130 to process each incoming packet. Further, the virtual machine 130 identifies the programs from among a set of programs that the hypervisor 120 is permitted to execute. The set of programs may be, e.g., a predetermined set of programs that have been verified as performing safe operations. As such, the virtual machine 130 specifies particular operations to be performed in response to particular incoming packets (e.g., packets that satisfy criteria specified by the virtual machine 130), but since the operations are programs from a predetermined set of safe programs, the hypervisor does not execute any potentially unsafe program code to process incoming packets.

In some embodiments, the virtual machine 130 may store the program mapping table 139 in the memory location 138 by writing the data values of the map to memory at appropriate offsets from the address of the memory location 138. In other embodiments, the virtual machine 130 may request the hypervisor 120 to store the program mapping table 139, e.g., by providing the data values for the map to the hypervisor as parameters to hypercalls.

Data storage manager 135 may execute as part of a kernel, driver, application, other computer program, or a combination thereof. In one example, data storage manager 135 may provide a user space process with access to a memory location by mapping the memory location into a storage address space of the user space process. In another example, data storage manager 135 may provide a user space process with access to a memory location by modifying the permissions of the user space process, the memory location, other object, or a combination thereof.

Memory locations 138 may be logical or physical units of data storage for storing, organizing, or accessing data. A memory location may include a contiguous or non-contiguous sequence of bytes or bits. In one example, a memory location may be a virtual representation of underlying physical storage units, which may be referred to as physical storage blocks. Memory locations 138 may have a unit size that is the same or different from a physical block size provided by an underlying hardware resource. The block size may be a fixed-size, such as a particular integer value (e.g., 4 KB, 4 MB, 1 GB) or may be a variable-size that varies within any range of integer values. Each of the memory locations 138 may have the same block size or a different block size when compared to an adjacent memory location. Memory locations 138 may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, memory locations 138 may be a memory segment and each memory segment may correspond to an individual memory page, multiple memory pages, or a portion of a memory page. In other examples, each of the memory locations 138 may correspond to a portion (e.g., block, sector) of a mass storage device (e.g., hard disk storage, solid state storage).

The program mapping table 139 may include one or more map entries, which are shown as rows in a table representing the program mapping table 139. Each entry may specify a criterion 140, one or more programs 142, and/or one or more processors 144. Each entry may specify identifiers or names that correspond to the criterion 140, program(s) 142, and/or processors 144. The hypervisor 120 may retrieve the map entries from the program mapping table 139, e.g., in response to receiving a signal 122, such as a hypervisor call, from the virtual machine 130. The hypervisor 120 may then determine whether each incoming data packet satisfies the criterion associated with each of the map entries. Thus, for each map entry, If the incoming data packet satisfies the criterion 140 specified by the map entry, then the hypervisor 120 causes execution of the program 142 specified by the map entry. Further, if the map entry specifies one or more processors 144, then the hypervisor 120 causes execution of the program 142 specified by the map entry on at least one of the processors 144 specified by the map entry. The particular processor 144 on which the program 142 is executed may be selected from the set of one or more processors 144 by the hypervisor 120.

Each program 142 may be specified as a program identifier or name, and each processor 144 may be specified as a processor identifier. For example, the program mapping table 139 includes a first map entry that specifies a criterion 140 of "Packet's ip.addr>=10.10.50.1 and ip.addr<=10.10.50.63," a program 142 of "Send Packet to URL Filter," and a processor 144 of "*" (e.g., no processor specified), which indicates that the program 142 may be executed on any processor of computing system 100, such as the processor that received the data packet. The first map entry can be stored in the memory location 138. A hypercall can be performed to inform the hypervisor 120 that the packet processing map 139 has been updated, or the hypervisor 120 can detect a change to the contents of the memory location 138. The hypervisor 120 can then configure an appropriate packet filter (e.g., using BPF features) or otherwise evaluate the criteria 140 for each received data packet 152. For each received data packet 152 that satisfies the criteria, e.g., has an IP address between 10.10.50.1 and 10.10.50.63, the hypervisor 120 can execute the corresponding program 142 on any processor of the computing system 100. The program 142 sends the data packet 152 to a URL filter service.

The program mapping table 139 also includes a second map entry that specifies a criterion 140 of "Packet's ip.addr>=10.10.50.64 and ip.addr<=10.10.50.127," program 142 "Send Packet to NAT (Network Address Translation) translator," and a processor 144 of "2, 3, 5," which indicates that the programs 142 specified by the map entry may be executed on any of processor 2, 3, or 5 of computing system 100. Thus, for each received data packet 152 that satisfies the criteria, e.g., has an IP address between 10.10.50.64 and 10.10.50.127, the hypervisor 120 can execute the program 142 on processor 2, 3, or 5. The program send the data packet 152 to a NAT translator service.

In an example, as described above, the virtual machine 130 may provide location data (e.g., an address) of the memory location 138 to the hypervisor 120. The virtual machine 130 may receive the location data from a memory allocator, for example. The hypervisor 120 may associate a hypercall parameter (e.g., identifier, index value, etc.) with the location data of a memory location 138. The hypervisor 120 may transmit a notification including the hypercall parameter to the user space process 134 to cause the user space process 134 to use the hypercall parameter when invoking a hypercall. The user space process may invoke the hypercall with the hypercall parameter to indicate to the hypervisor 120 that the program mapping table stored at the memory location 138 associated with the hypercall parameter has been updated.

Signal 122 may be initiated by guest code executed by virtual machine 130 and may cause hypervisor 120 to process a hypercall. The guest code (e.g., guest executable code) may include one or more guest operating systems, applications, drivers, other executable code, or a combination thereof. Signal 122 may be initiated by guest code that is being executed by guest operating system 132, user space process 134, a kernel process, other executable code, or a combination thereof. In the example shown in FIG. 1, user space process 134 may initiate the transmission of signal 122 from virtual machine 130 to hypervisor 120. User space process 134 may initiate the signal transmission without involving the kernel of the guest operating system 132 and therefore may bypass the kernel and communicate directly with the hypervisor. In another example, the user space process 134 may initiate the transmission of signal 122 but the kernel may be involved with transmitting the signal 122 to hypervisor 120. In either example, signal 122 may cause a processing device of computing system 100 to switch from executing user space process 134 to executing hypervisor 120.

Signal 122 may be generated by a hypercall that is invoked by a user space process of guest operating system 132 or by the virtual machine 130. The hypercall may be a command (e.g., a CPU command or instruction) that causes an immediate switch from the guest executable code to the hypervisor when executed. The switch may occur without executing any guest kernel configurable security checks by the processor (e.g., CPU), which may enable the hypercall to be fast (e.g., less processing cycles) but less secure. The hypercall may vary depending on the underlying hardware architecture and its instruction set architecture (ISA) and may involve the execution of a VMCALL instruction on an Intel® processors, a VMMCALL instruction on AMD® processors, a HVC instruction on ARM® processors, or other instruction on another processor. The hypercall may be associated with a particular memory location 138, and the memory location 138 may include a program mapping table 139. The virtual machine 130 may also store the hypercall parameter in a storage field (e.g., general purpose register) when invoking the hypercall to enable the hypervisor 120 to read one or more mapping table entries of the program mapping table 139 from the memory location 138 and to subsequently evaluate the criterion 140 of each of the read mapping table entries in response to each incoming packet from network 140 and invoke the corresponding program 142 if the criterion 140 is satisfied, at least until the program mapping table 130 is changed and the virtual machine 130 invokes another hypercall that causes the hypervisor 120 to read the updated program mapping table 139.

Network 140 may be a public network (e.g., the Internet), a private network (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

As described above, the virtual machine 130 may transmit a notification including a hypercall parameter to the user space process 134 to cause the user space process 134 to use the hypercall parameter when invoking the hypercall to indicate to the hypervisor 120 that the program mapping table 139 has been updated.

When the virtual machine 130 invokes the hypercall and causes the signal 122 to be transmitted to the hypervisor 120, virtual machine 130 may store signal data 123 (e.g., hypercall parameter(s)) in a storage field (e.g., general purpose register of the processing device). For example, signal data 123 may include a hypercall parameter provided by the hypervisor 120 and used by the hypervisor to identify the memory location that includes a request available for processing. Signal data 123 may be included internal to the signal, external to the signal, or a combination thereof. For example, a first portion of signal data 123 may be included within the signal and a second portion of signal data 123 may be stored at a specific storage field that the processing device or hypervisor checks in response to the signal. The specific storage field may include specific processor registers, memory blocks, mass storage objects (e.g., files, database records), storage units, other data storage location, or a combination thereof.

Signal data 123 may include data that a hypervisor can analyze to indirectly or directly identify the storage unit that has the request. Signal data 123 may directly identify the storage unit when signal data 123 includes data that a hypervisor can use to directly identify a particular memory location (e.g., an address). Signal data 123 may indirectly identify the storage unit when signal data 123 includes data that a hypervisor can resolve to identify one or more memory locations. The hypervisor may resolve the signal data 123 using a mapping data structure (not shown), which may include a mapping between hypercall parameter data (e.g., hypercall parameter) and a memory location data (e.g., memory location address).

The hypervisor 120 may determine the memory location 138 using the association between the hypercall parameter and the memory location 138. For example, the hypervisor 120 may use the hypercall parameter to lookup the memory location address in the mapping data structure. The hypervisor may validate the program mapping table 139 stored at the memory location address. To validate the program mapping table 139, the hypervisor may, for example, determine whether each entry of the map 139 specifies a valid criterion 140, specifies a valid program 142, and specifies a valid processor(s) 144 (if the entry specifies any processors).

The hypervisor may use the criteria specified by the program mapping table 139, which may be an updated version of the program mapping table 139, to process subsequently-received packets, e.g., to process packets received subsequent to an invocation by the virtual machine 130 or space process 134 of a hypercall indicating that the program mapping table stored at the memory location 138. As an example, the hypercall parameter may include an index value, and the hypervisor may access a portion of the mapping data structure that corresponds to the index value to determine the address of a memory location.

A guest user space process 134 initiating the signal 122 may cause the guest operating system to bypass a kernel of the guest operating system and signal to the hypervisor that an updated program mapping table 139 is stored and waiting to be processed. The signal 122 may initiate a trap (e.g., hardware trap) that causes the processing device executing the user space process to switch from executing the guest executable code of the virtual machine to executing the hypervisor. The switch may be a context switch that transitions execution of the processing device from a guest user space process to a hypervisor process. In one example, the signal 122 may be initiated by the user space process by executing a hypercall and be directly transmitted to the hypervisor without causing the guest kernel to execute. In another example, the signal may be initiated by the user space process and may be indirectly transmitted to the hypervisor. The indirect transmission may involve the user space process using a system call to communicate the signal to the guest kernel and the guest kernel communicating the signal to the hypervisor (e.g., via a hypercall). In either example, the hypercall may be associated, via the hypercall parameter data, with a particular memory location storing a program mapping table 139 before, during, or after the initiation of the signal.

As discussed above, the signal may be a hypercall, and prior to executing the hypercall, the guest executable code 232 (e.g., user space process) may update one or more of the specific fields (e.g., registers of the processing device). The hypercall may cause a trap (e.g., hardware trap) that switches the execution of the processing device from the guest executable code to the hypervisor. The hypervisor may respond to the trap by checking the one or more specific fields to determine that the trap was in response to a hypercall and to determine that the hypercall was a predefined type (e.g., wake hypercall). In response to the trap being associated with the predefined type of hypercall, the hypervisor may access another specific field that includes a portion of signal data 123 (e.g., an index value). The hypervisor may then resolve the signal data 123 to a particular memory location using the mapping data structure. The hypervisor may access the memory location to retrieve and validate the program mapping table 139 (e.g., determine whether each entry of the map 139 specifies a valid criterion 140, specifies a valid program 142, and specifies a valid processor(s) 144 (if the entry specifies any processors).

The hypervisor 120 may receive one or more data packets 152, e.g., via network interface device 112A, from network 140. Each data packet 152 may be accessible to the hypervisor 120 in hypervisor data storage 150 (e.g., hypervisor memory). Each data packet 152 may include a destination address 154, a source address 156, a packet type 158 (e.g. a protocol type, such as Ethernet, IP, TCP, UDP, or other defined protocol type), and a payload 160 (e.g., the data contained in the packet, which may be another packet encapsulated within the data packet 152).

The hypervisor 120 may process incoming data packets 152 using the program(s) 142 specified in the packet processing map 139 according to the criterion 140. The hypervisor 120 may execute the program(s) 142 associated with a criterion 140 on any available processor of the computing system 100 if no particular processor 144 is specified. The available processor may be the processor that received the data packet 152, for example. Alternatively, if one or more particular processors 144 are specified, then the hypervisor 120 may execute a processor selection program, which may select one of the processor(s) 144, move the program(s) 142 and associated input, such as the data packet 152, to the selected processor as appropriate, and cause the selected processor to execute the program(s) 142.

If the map entry does not specify a processor 144, then the hypervisor may, for each subsequently-received packet, evaluate the criteria 140 specified by the map entries. For each of the map entries having a criterion that is satisfied by a packet, the hypervisor may execute the respective program 142 identified by the respective map entry. To evaluate each criterion and execute the respective program, the hypervisor may use packet filtering features of the LINUX kernel (e.g., a Berkeley Packet Filter (BPF) features and/or Express Data Path (XDP) features). The hypervisor can create a packet filtering rule for each map entry, using the map entry's criterion 140 as the filtering condition (and translating the criterion 140 to the filtering rule as needed). Each program 142 can be a BPF program and can thus be specified as the program associated with the respective filtering rule.

If the map entry specifies one or more processors 144, the hypervisor may cause the program 142 to be executed on one of the specified processor(s) 144. To cause a program 142 to be executed on one of a set of specified processors 144, the hypervisor may use the kernel packet filter features described above, but specify a processor selection program as the program associated with each filtering rule that specifies a set of processors 144. The kernel then invokes the processor selection program in response to receiving a packet that satisfies the corresponding criterion. The processor selection program can access the set of specified processors and select one of the processors from the set. For example, the processor selection program can use a round-robin processor allocation scheme, in which the each invocation of the selection program selects the next processor in the set according to an ordering determined for the set. The selection program can use other allocation schemes, e.g., a random selection scheme, in which a processor is selected based on a random number. The processor selection program may use a LINUX kernel CPU map to move the program 142 and associated input, including the packet, to the selected processor. The selected processor may then execute the program 142 using the packet as input.

The hypervisor may respond to the trap by checking the one or more specific storage fields to determine that the trap was in response to a hypercall and to determine that the hypercall was a predefined type (e.g., wake hypercall). In response to the trap being associated with the predefined type of hypercall, the hypervisor may access another specific field (e.g., register) that includes a portion of signal data 123 (e.g., a hypercall parameter). The hypervisor may then resolve the signal data 123 to a particular memory location using mapping data structure 246.

A hypervisor 130 executing on a first processor of a computing system 100 may receive a data packet via a network interface device 112A. The hypervisor 130 may identify a memory location 138 associated with a guest virtual machine 130 and accessible to the guest virtual machine 130 and the hypervisor 120. A program mapping table 139 comprising one or more mapping table entries may be stored at the memory location 138. Each mapping table entry may specify a program selection criterion 140 and a packet processing program 142.

The hypervisor 130 may identify, among the one or more mapping table entries in the program mapping table 139 stored at the memory location 138, a mapping table entry comprising a particular program selection criterion 140 that is satisfied by the data packet. The identified mapping table entry may specify a first packet processing program. The hypervisor 130 may execute the first packet processing program using the data packet as input.

The particular program selection criterion may include one or more threshold values, and the hypervisor 130 may identify the mapping table entry by comparing a value included in the data packet to the one or more threshold values. The value included in the data packet may be a network address or a network connection identifier, for example.

The program selection criterion may be a threshold rang, in which case the threshold values may include first and second threshold values, and the program selection criterion is satisfied if the value included in the data packet is between the first and second threshold values. The program selection criterion may be a packet filter condition, in which case the program selection criterion is satisfied if the data packet satisfies the packet filter condition.

The hypervisor 130 may identify the mapping table entry by searching the mapping table for a mapping table entry comprising the particular program selection criterion that is satisfied by the data packet. To identify the memory location associated with the guest virtual machine, the hypervisor 130 may allocate the memory location, and send a notification comprising an address of the memory location to the guest virtual machine. Alternatively or additionally, to identify the memory location associated with the guest virtual machine, the hypervisor 130 may receive an address of the memory location from the guest virtual machine. The hypervisor 130 may identify the mapping table entry subsequent to detecting that the guest virtual machine has invoked a hypercall indicating that the guest virtual machine has stored the one or more mapping table entries at the memory location.

The hypervisor 130 may execute a second packet processing program, which may provide the data packet and the first packet processing program to a second processing device identified among the one or more second processing devices. The second processing device may then execute the first packet processing program. The second packet processing program may identify the second processing device among the one or more second processing devices.

The hypervisor 130 may identify a second memory location associated with the guest virtual machine and accessible to the guest virtual machine and the hypervisor. The second packet processing program may then identify the second processing device using one or more processor selection data values stored at the second memory location. For example, the second packet processing program may retrieve a processor identifier that identifies the second processing device from the mapping table entry. As another example, the second packet processing program may identify the second processing device using one or more processor selection data values specified by the mapping table entry. The second processing device may alternatively be specified by another mapping table, referred to herein as a processor mapping table, in which case a processor mapping table entry may specify the particular program selection criterion that is satisfied by the data packet, and may also specify the processor identifier that identifies the second processing device.

The first packet processing program may determine, using the data packet, whether to discard the data packet, and, responsive to determining to discard the data packet, discard the data packet. As another example, the first packet processing program may determine, using the data packet, whether to forward the data packet, and, responsive to determining to forward the data packet, send the data packet to a destination address. To determine whether to forward the data packet, the first packet processing program may identify a connection identifier specified by the data packet, and identify the destination address using the connection identifier. The destination address may correspond to a second guest virtual machine that receives the data packet.

The first packet processing program may generate a second packet that encapsulates the first packet, and send the second packet to a destination address. As another example, the first packet processing program may generate a second packet that includes a de-encapsulated payload of the first packet, and send the second packet to a destination address specified by the second packet.

Figure 2:
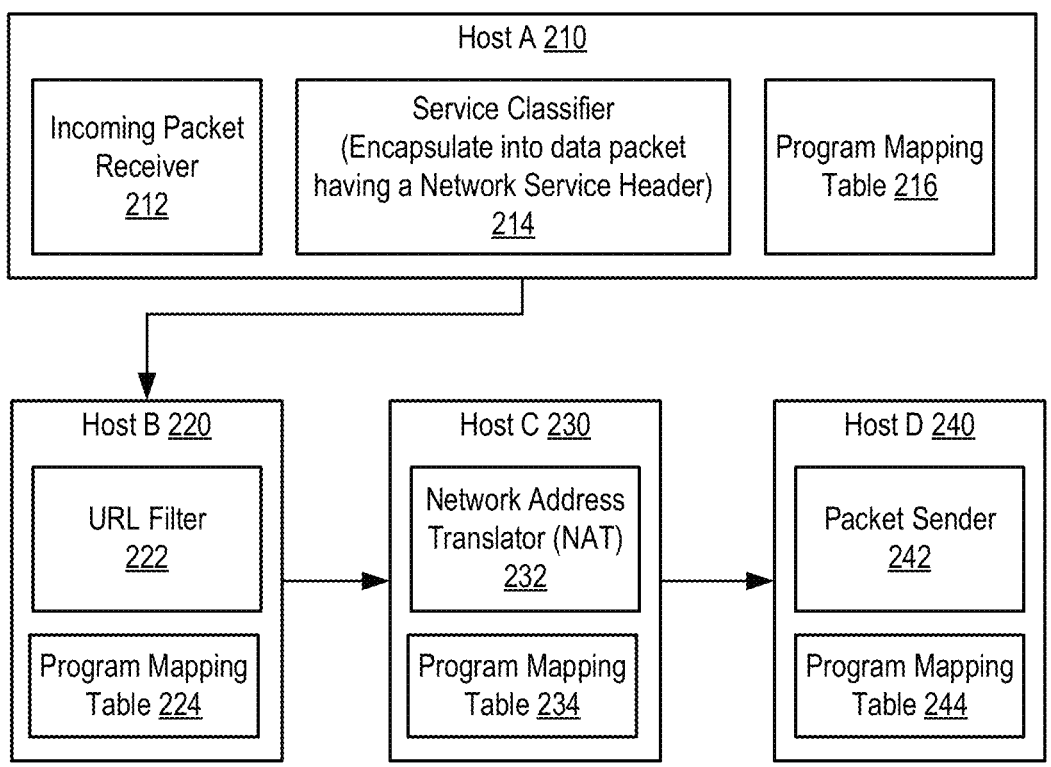
FIG. 2 depicts a block diagram of an example service chain in which each service function is performed on a corresponding host computer system using a packet processing program that is specified in a program mapping table in accordance with one or more aspects of the present disclosure.

FIG. 2 depicts a block diagram of an example service chain 200 in which each service function is performed on a corresponding host computer system using a packet processing program that is specified in a program mapping table in accordance with one or more aspects of the present disclosure. The service chain 200 can perform service functions such as URL filtering and network address translation (NAT) on incoming packets, and send outgoing packets generated by the service functions. URL filtering can involve discarding each packet having a URL that is in a list of harmful sites. Network address translation can involve modifying the address information in packets, e.g., to map multiple private hosts to one publicly-exposed Internet Protocol (IP) address. An incoming packet can follow a path ("service path") through the service functions, e.g., the path from the service classifier 214 to the URL filter 222, the network address translator 232, and the packet sender 242 shown in FIG. 2. Each service function can be performed by a different host system, which can receive a packet, perform a service function based on the packet, and send a resulting packet to the next host in the service path. The hosts include a host A 210, host B 220, host C 230, and host D 240, each of which includes a respective program mapping table 216, 224, 234, 244 that can specify criteria for processing packets received by the respective host using packet processing programs, as described with respect to FIGS. 3A-3D below. The program mapping table on each host can be created by a virtual machine 130 on the respective host.

Host A 210 includes an incoming packet receiver 212, a service classifier 214, and a program mapping table 216. The incoming packet receiver 212 receives an incoming packet from a network 140. A service classifier 214 encapsulates the received packet into a data packet having a Network Service Header. The data packet includes the received packet as a payload. The Network Service Header can include information related to processing the packet in the service chain 200, such as a service path identifier and a service path index that identify the status of the packet in the service chain 200. Host A 210 also includes a program mapping table 216 stored in a memory, e.g., guest data storage 136, at a memory location 138. The program mapping table 216 can specify programs to be executed to implement at least a portion of the service classifier 214. For example, the program mapping table 216 can specify that for each received packet in Internet Protocol version 4 (IPv4) format, a packet encapsulation program that adds a Network Service Header to the received packet is to be executed, thereby generating a data packet having the Network Service Header and the received packet as a payload. The program mapping table 216 can further specify that the data packet is to be sent to the URL filter 222 on host B 220. A hypervisor 120 on host A 210 can perform these actions specified by the program mapping table 216 for each packet received by host A 210.

The URL filter 222 on host B 220 can receive a data packet from host A 210 and discard the data packet if the data packet includes a URL that is in a list of harmful sites. Each discarded packet is not processed further by the service chain 200. The program mapping table 224 on host B 220 can specify programs to be executed to implement at least a portion of the URL filter 222. For example, the program mapping table 224 can specify that for each received packet having an IP port of 80 or 8080, a URL filtering program is to be executed. The URL filtering program can compare the packet's URL to a list of harmful sites, or send the packet's URL to a service that compare's the packet's URL to a list of harmful sites. If the packet's URL is in the list of harmful sites, the URL filtering program can discard the packet, e.g., perform no further action. If the packet's URL is not in the list of harmful sites, the a packet sending program can send the packet to the network address translator 232 on host C 230.

Further, the program mapping table 224 can specify that for each received packet not having an IP port of 80 or 8080, a packet sending program is to send the packet to the network address translator 232 on host C 230. A hypervisor 120 on host B 220 can perform these actions specified by the program mapping table 224 for each packet received by host B 220.

The network address translator 232 on host C 230 can receive a data packet from host B 220 and perform network address translation if the data packet is in IPv4 format. The program mapping table 234 on host C 230 can specify programs to be executed to implement at least a portion of the network address translator 232. For example, the program mapping table 234 can specify that for each received packet that is in IPv4 format, a network address translation program is to be executed, and a packet sending program is to be executed to send the translated packet to host D 240. A hypervisor 120 on host C 230 can perform these actions specified by the program mapping table 234 for each packet received by host C 230.

The packet sender 242 on host D 240 can receive a data packet from host C 230, de-encapsulate the packet by removing the Network Service Header, and send the data packet to a specified destination, e.g., an Internet gateway that in turn sends the packet to the packet's destination address on the public Internet. The program mapping table 244 on host D 240 can specify programs to be executed to implement at least a portion of the packet sender 242. For example, the program mapping table 244 can specify that for each received packet having a destination IP address less than or equal to 10.10.50.1, a de-encapsulation program is to removing the packet's Network Service Header, and a packet sending program is to send the resulting packet (e.g., the payload of the received packet) to an Internet gateway G1.

The program mapping table 244 can further specify that for each received packet having a destination IP address greater than 10.10.50.1, a de-encapsulation program is to removing the packet's Network Service Header, and a packet sending program is to send the resulting packet (e.g., the payload of the received packet) to an Internet gateway G2.

FIGS. 3A-3D depict example data structures representing program mapping tables that map packet selection criteria to respective packet processing programs and processors, in accordance with one or more aspects of the present disclosure. FIG. 3A depicts an example first program mapping table 216, which can be stored in guest data storage 136 at a memory location 138 of host A 210. The example first program mapping table 216 includes one mapping table entry, which specifies that URL filtering is to be performed on incoming packets having IP port 80 or 8080 are to be encapsulated by adding a Network Service Header, and the resulting data packet is to be sent to host B 220. The mapping table entry thus specifies a criterion 340A, and one or more programs 342A. The mapping table entry does not specify any processors 344A, as denoted by an asterisk ("*") in the processor(s) 344A column of the table 216. Since no specific processors are specified, the programs specified by the mapping table entry can be executed on the processor that receives the incoming packet. The criterion 340A is that the incoming packet is in IPv4 format. The programs 342A include a program P1, which encapsulates an incoming packet that satisfies the criterion 340A into a service chaining packet having a Network Service Header as described above with respect to FIG. 2, and a program P2, which can be executed after P1, and sends the resulting encapsulated data packet to host B 220. The programs may be specified by their program identifiers, e.g., P1 and P2.

FIG. 3B depicts an example second program mapping table 224, which can be stored in guest data storage 136 at a memory location 138 of host B 220. The example second program mapping table 224 includes two mapping table entries. The first table entry in table 224 specifies that URL filtering is to be performed on packets having port 80 or 8080, and the resulting data packets are to be sent to host C 230. Thus, the first table entry specifies a criterion 340B, programs 342B, and processors 344B on which program(s) 342B are to be executed for each packet that satisfies criterion 340B. The criterion 340B of the first table entry is that the incoming packet's IP port is 80 or 8080. The programs 342B of the first table entry include a program P3 that performs URL filtering as described above with respect to FIG. 2 and a program P4 that sends the filtered packet (if any, e.g., if the received packet is not discarded) to host C 230. The programs may be specified by their program identifiers, e.g., P3 and P4.

The first table entry specifies a particular processor 344B having processor identifier 1, thereby indicating that programs P3 and P4 are to be executed on processor 1 if the packet's port is 80 or 8080. To execute the programs on a specific processor (e.g., processor 1), the hypervisor may configure a kernel packet filtering mechanism (e.g., BPF) to invoke a dispatcher program when the criterion 340A of the table entry is satisfied. The dispatcher program can provide the received data packet and the specified programs 342B of the table entry to a processor specified by the table entry, and cause the specified processor to execute the specified programs 342B, e.g., using the LINUX kernel CPU map mechanism. If more than one processor is specified by the table entry, the dispatcher program can select one of the specified processors, e.g., using an allocation algorithm such as round-robin or random selection.

A second table entry in table 224 specifies that packets not having an IP port of 80 or 8080 are to be sent to host C 230 without performing URL filtering. The second table entry includes a criterion 340B, program 342B, and processors 344B on which program 342B is to be executed for each packet that satisfies criterion 340B. The criterion 340B of the second table entry is that the incoming packet's IP port is not 80 and not 8080. The program 342B of the second table entry is a program P4 that sends the data packet to host C 230. The second table entry specifies a particular processor 344B having processor identifier 2, thereby indicating that program P4 is to be executed on processor 1 if the packet's port is not 80 and not 8080.

FIG. 3C depicts an example third program mapping table 234, which can be stored in guest data storage 136 at a memory location 138 of host C 230. The example third program mapping table 234 includes two mapping table entries. A first table entry in table 234 specifies that NAT is to be performed on packets that are in IPv4 format, and the resulting packet is to be sent to host D 240. The first table entry specifies a criterion 340C, programs 342C, and processors 344C on which program(s) 342C are to be executed for each packet that satisfies criterion 340C. The criterion 340C of the first table entry is that the incoming packet is in IPv4 format. The programs 342C of the first table entry include a program P5 that performs NAT as described above with respect to FIG. 2 and a program P6 that sends the translated packet to host D 240. The first table entry specifies particular processors 344C having processor identifiers 1, 2, 3, and 4, thereby indicating that programs P5 and P6 are to be executed on one of processors 1, 2, 3, or 4 if the packet is in IPv4 format.

A second table entry in table 234 specifies that packets in IPv6 format are to be sent to host D 240 without performing NAT. The second table entry in table 234 specifies a criterion 340C, program 342C, and processors 344C on which program 342C is to be executed for each packet that satisfies criterion 340C. The criterion 340C of the second table entry is that the incoming packet is in IPv6 format. The program 342C of the second table entry is a program P6 that sends the data packet to host D 240. The second table entry specifies processors 344C having processor identifiers 5, 6, and 7, thereby indicating that program P6 is to be executed on one of processors 5, 6, or 7 if the packet is in IPv6 format.

FIG. 3D depicts an example fourth program mapping table 244, which can be stored in guest data storage 136 at a memory location 138 of host D 240. The example fourth program mapping table 244 includes two mapping table entries. A first table entry in table 244 specifies that a packet is to be de-encapsulated (e.g., by removing the Network Service Header) if the packet's destination IP address is less than or equal to 10.10.50.1, and the resulting packet is to be sent to an Internet gateway G1. Thus, the first table entry specifies a criterion 340D, programs 342D, and processors 344D on which program(s) 342D are to be executed for each packet that satisfies criterion 340D. The criterion 340D of the first table entry is that the incoming packet's destination IP address is less than or equal to 10.10.50.1. The programs 342D of the first table entry include a program P7 that de-encapsulates the packet's payload into an outgoing packet and a program P6 that sends the outgoing packet (e.g., the de-encapsulated payload) to Internet gateway G1. The first table entry specifies particular processors 344D having processor identifiers 1, 2, and 3, thereby indicating that programs P7 and P8 are to be executed on one of processors 1, 2, or 3 if the packet's IP address is less than or equal to 10.10.50.1.

A second table entry in table 244 specifies that packets having a destination IP address greater than 10.10.50.1 are to be sent to Internet gateway G2. The second table entry in table 244 specifies a criterion 340D, programs 342D, and processors 344D on which programs 342D are to be executed for each packet that satisfies criterion 340D. The criterion 340D of the second table entry is that the incoming packet's destination address is greater than 10.10.50.1. The programs 342D of the second table entry include program P7, which de-encapsulates the incoming packet, and a program P6, which sends the resulting de-encapsulated packet to Internet gateway G2. The second table entry specifies processors 344D having processor identifiers 4, 5, 6, and 7, thereby indicating that program P6 is to be executed on one of processors 4, 5, 6, or 7 if the packet's destination IP address is greater than 10.10.50.1.

Figure 4:
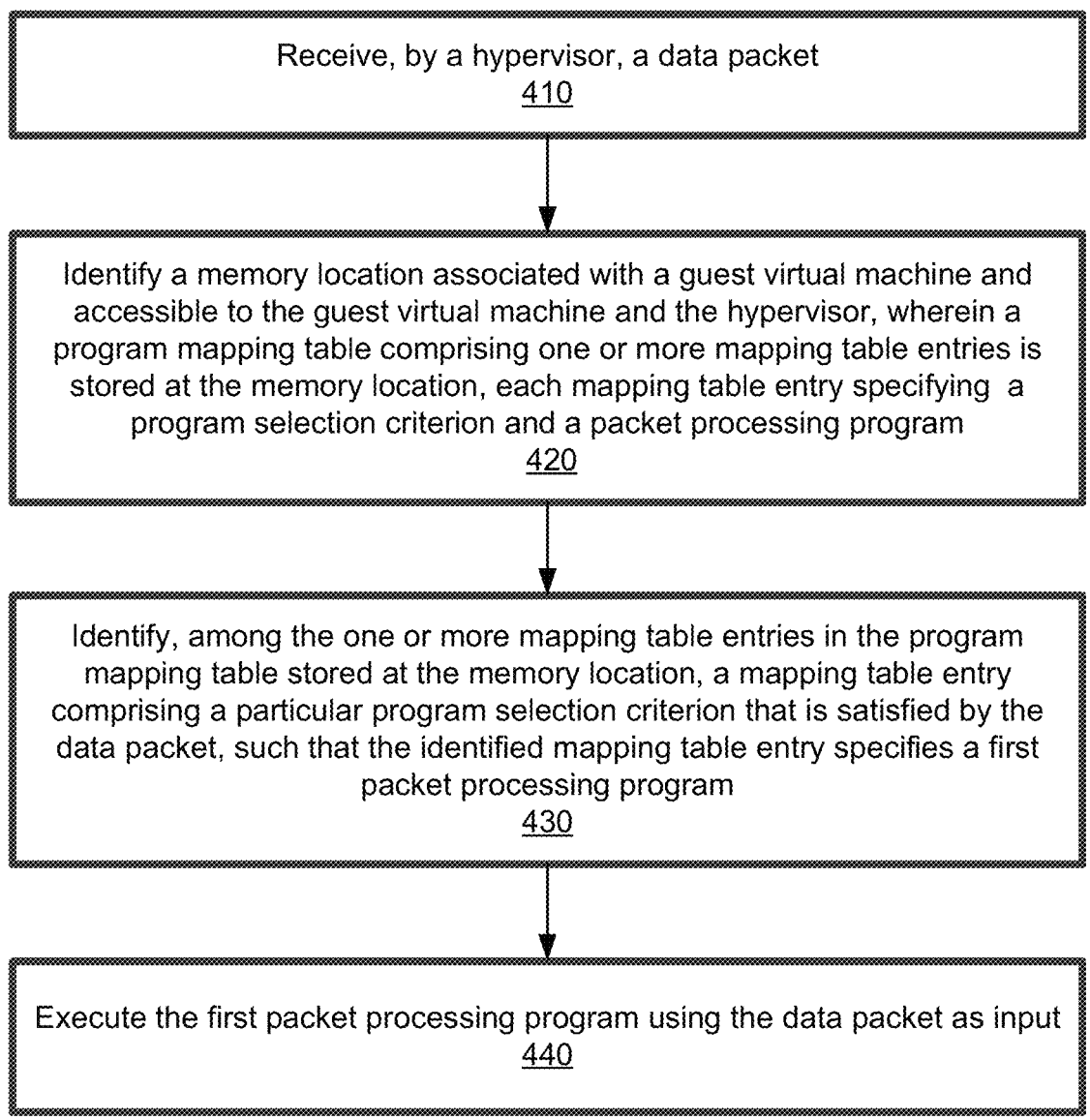
FIG. 4 depicts a flow diagram of an example method for a hypervisor to identify a packet processing program using a program mapping table specified by a guest virtual machine, and execute the packet processing program, in accordance with one or more aspects of the present disclosure.

FIG. 4 depicts a flow diagram of an example method 400 for a hypervisor to identify a packet processing program using a program mapping table specified by a guest virtual machine, and execute the packet processing program, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system 100 may receive, by a hypervisor 120, a data packet. The host computer system may receive the data packet via a network interface device 112A, for example. At block 420, the host computer system may identify a memory location 138 associated with a guest virtual machine 130 and accessible to the guest virtual machine and the hypervisor, wherein a program mapping table 139 comprising one or more mapping table entries is stored at the memory location, each mapping table entry specifying a program selection criterion and a packet processing program. At block 430, the host computer system may identify, among the one or more mapping table entries in the program mapping table stored at the memory location, a mapping table entry comprising a particular program selection criterion that is satisfied by the data packet, such that the identified mapping table entry specifies a first packet processing program. At block 440, the host computer system may execute the first packet processing program using the data packet as input. Responsive to completing the operations described herein above with references to block 440, the method may terminate.

Figure 5:
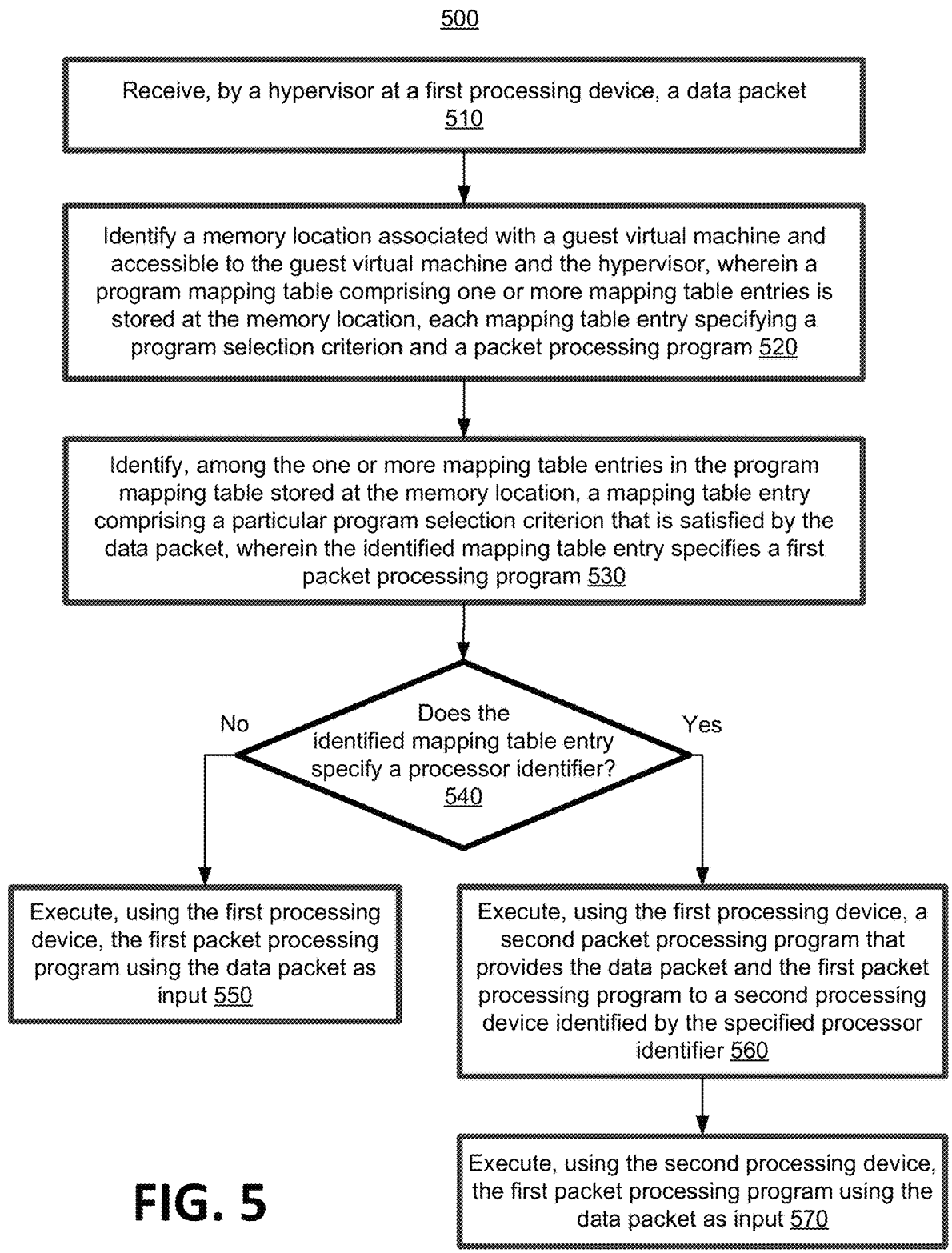
FIG. 5 depicts a flow diagram of an example method for a hypervisor to identify a packet processing program and a second processing device using a program mapping table specified by a guest virtual machine, and execute the packet processing program on the second processing device, in accordance with one or more aspects of the present disclosure.

FIG. 5 depicts a flow diagram of an example method 500 for a hypervisor to identify a packet processing program and a second processing device using a program mapping table specified by a guest virtual machine, and execute the packet processing program on the second processing device, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a host computer system may receive, by a hypervisor at a first processing device, a data packet. At block 520, a host computer system may identify a memory location associated with a guest virtual machine and accessible to the guest virtual machine and the hypervisor, wherein a program mapping table comprising one or more mapping table entries is stored at the memory location, each mapping table entry specifying a program selection criterion and a packet processing program.

At block 530, the host computer system may identify, among the one or more mapping table entries in the program mapping table stored at the memory location, a mapping table entry comprising a particular program selection criterion that is satisfied by the data packet, wherein the identified mapping table entry specifies a first packet processing program. At block 540, the host computer system may determine whether the identified mapping table entry specifies a processor identifier. If the identified mapping table entry does not specify a processor identifier, then at block 550, the host computer system may execute, using the first processing device, the first packet processing program, wherein the data packet is provided to the first packet processing program as input.

If the identified mapping table entry specifies a processor identifier, then at block 560, the host computer system may execute, using the first processing device, a second packet processing program that provides the data packet and the first packet processing program to a second processing device identified by the specified processor identifier. The second packet processing program may be a predefined processor selection program included in hypervisor 120 that can select a processor from a set of one or more processors 144, move the first program and associated input, such as the data packet, to the selected processor, and cause the selected processor to execute the first program, as described above with respect to FIG. 1. At block 570, the host computer system may execute, using the second processing device, the first packet processing program using the data packet as input. Responsive to completing the operations described herein above with references to block 550 or 570, the method may terminate.

Figure 6:
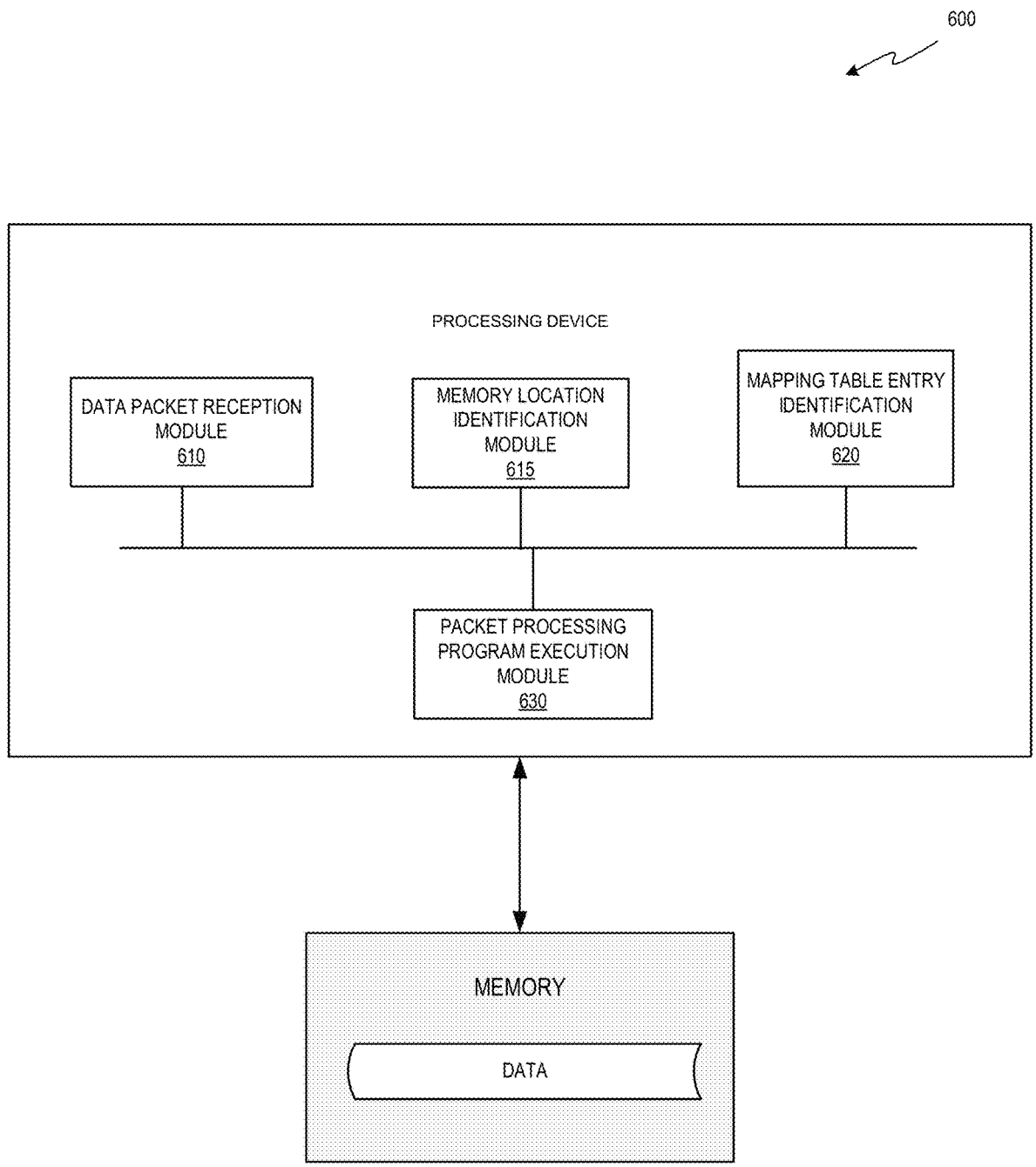
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 may be the same or similar to computing device 100 of FIG. 1, and may include one or more processors and one or more memory devices. In the example shown, computer system 600 may include a data packet reception module 610, a memory location identification module 615, a mapping table entry identification module 620, and a packet processing program execution module 630.

Data packet reception module 610 may enable a processor to receive, by a hypervisor, a data packet. Memory location identification module 615 may enable the processor to identify a memory location associated with a guest virtual machine and accessible to the guest virtual machine and the hypervisor, wherein a program mapping table comprising one or more mapping table entries is stored at the memory location, each mapping table entry specifying a program selection criterion and a packet processing program.

Mapping table entry identification module 620 may enable the processor to identify, among the one or more mapping table entries in the program mapping table stored at the memory location, a mapping table entry comprising a particular program selection criterion that is satisfied by the data packet. The identified mapping table entry specifies a first packet processing program. Packet processing program execution module 630 may enable the processor to execute the first packet processing program, where the data packet is provided to the first packet processing program as input.

Figure 7:
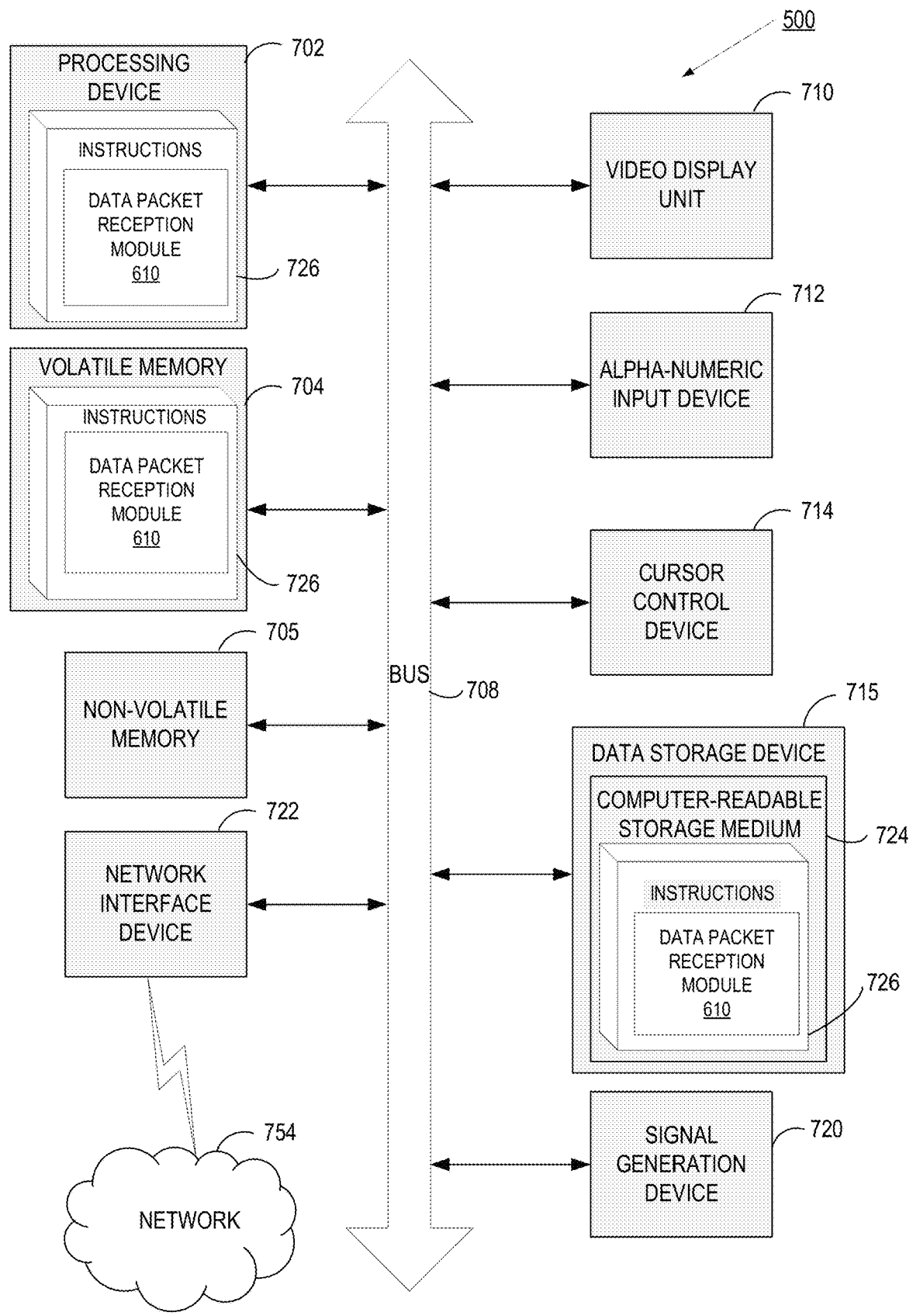
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computing system 100 of FIG. 1 or host 210, 220, 23, 240 of FIG. 2. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 400 or 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating,"

"using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
    a memory device comprising a group of memory units; and
    a first processing device, operatively coupled to the memory device, to perform operations comprising:
        receiving, by a hypervisor, a data packet;
        identifying a memory location associated with a guest virtual machine and accessible to the guest virtual machine and the hypervisor, wherein a program mapping table comprising one or more mapping table entries is stored at the memory location, each mapping table entry specifying a program selection criterion and a packet processing program;
        identifying, among the one or more mapping table entries in the program mapping table stored at the memory location, a mapping table entry comprising a particular program selection criterion that is satisfied by the data packet at least in part by determining if a value included in the data packet is between first and second threshold values of the particular program selection criterion, wherein the identified mapping table entry specifies a first packet processing program; and
        in response to identifying the mapping table entry comprising the particular program selection criterion that is satisfied by the data packet, executing the first packet processing program, wherein the data packet is provided to the first packet processing program as input.

2. The system of claim 1, wherein the value included in the data packet comprises one or more of a network address or a connection identifier.

3. The system of claim 1, wherein the particular program selection criterion comprises a packet filter condition, and the particular program selection criterion is satisfied if the data packet satisfies the packet filter condition.

4. The system of claim 1, wherein identifying the mapping table entry comprises:
    searching the mapping table for the mapping table entry comprising the particular program selection criterion that is satisfied by the data packet.

5. The system of claim 1, wherein identifying the memory location associated with the guest virtual machine comprises:
    allocating the memory location; and
    sending a notification comprising an address of the memory location to the guest virtual machine.

6. The system of claim 1, wherein identifying the memory location associated with the guest virtual machine comprises:
    receiving an address of the memory location from the guest virtual machine.

7. The system of claim 1, wherein identifying the mapping table entry occurs subsequent to detecting that the guest virtual machine has invoked a hypercall indicating that the guest virtual machine has stored the one or more mapping table entries at the memory location.

8. The system of claim 1, wherein the system further comprises one or more second processing devices, operatively coupled to the memory device, and the operations further comprise:
    determining that the identified mapping table entry specifies a processor identifier;
    identifying, among the one or more second processing devices, a second processing device that corresponds to the specified processor identifier;
    executing a second packet processing program that provides the data packet and the first packet processing program to the second processing device.

9. The system of claim 8, wherein the system further comprises one or more second processing devices, operatively coupled to the memory device, and the operations further comprise:
    executing a second packet processing program, wherein the second packet processing program identifies the second processing device among the one or more second processing devices and provides the data packet and the first packet processing program to the second processing device.

10. The system of claim 8, wherein the second processing device executes the first packet processing program.

11. The system of claim 8, wherein the second processing device is specified by the mapping table entry.

12. The system of claim 8, wherein the second processing device is specified by a second mapping table entry in a processor mapping table, wherein the second mapping table entry further specifies the particular program selection criterion that is satisfied by the data packet.

13. The system of claim 8, wherein the operations further comprise:
    identifying a second memory location associated with the guest virtual machine and accessible to the guest virtual machine and the hypervisor, wherein the second packet processing program identifies the second processing device using one or more processor selection data values stored at the second memory location.

14. The system of claim 8, the wherein second packet processing program identifies the second processing device using one or more processor selection data values specified by the mapping table entry.

15. The system of claim 1, wherein the first packet processing program performs one or more packet processing operations comprising:
   generating a second packet that encapsulates the data packet; and
   sending the second packet to a destination address.

16. The system of claim 1, wherein the first packet processing program performs one or more packet processing operations comprising:
   generating a second packet that includes a de-encapsulated payload of the data packet; and
   sending the second packet to a destination address specified by the second packet.

17. A method comprising:
   receiving, by a hypervisor executing on a first processing device, a data packet;
   identifying a memory location associated with a guest virtual machine and accessible to the guest virtual machine and the hypervisor, wherein a program mapping table comprising one or more mapping table entries is stored at the memory location, each mapping table entry specifying a program selection criterion and a packet processing program;
   identifying, among the one or more mapping table entries in the program mapping table stored at the memory location, a mapping table entry comprising a particular program selection criterion that is satisfied by the data packet at least in part by determining if a value included in the data packet is between first and second threshold values of the particular program selection criterion, wherein the identified mapping table entry specifies a first packet processing program; and
   in response to identifying the mapping table entry comprising the particular program selection criterion that is satisfied by the data packet, executing the first packet processing program, wherein the data packet is provided to the first packet processing program as input.

18. A non-transitory machine-readable storage medium storing instructions which, when executed by a processing device, cause the processing device to:
   receive, by a hypervisor executing on a first processing device, a data packet;
   identify a memory location associated with a guest virtual machine and accessible to the guest virtual machine and the hypervisor, wherein a program mapping table comprising one or more mapping table entries is stored at the memory location, each mapping table entry specifying a program selection criterion and a packet processing program;
   identify, among the one or more mapping table entries in the program mapping table stored at the memory location, a mapping table entry comprising a particular program selection criterion that is satisfied by the data packet at least in part by determining if a value included in the data packet is between first and second threshold values of the particular program selection criterion, wherein the identified mapping table entry specifies a first packet processing program; and
   in response to identifying the mapping table entry comprising the particular program selection criterion that is satisfied by the data packet, execute the first packet processing program, wherein the data packet is provided to the first packet processing program as input.

* * * * *